June 2, 1964   M. R. STEERE ETAL   3,135,492
RESETTABLE POSITIONING DEVICE
Filed Feb. 7, 1958
6 Sheets-Sheet 1
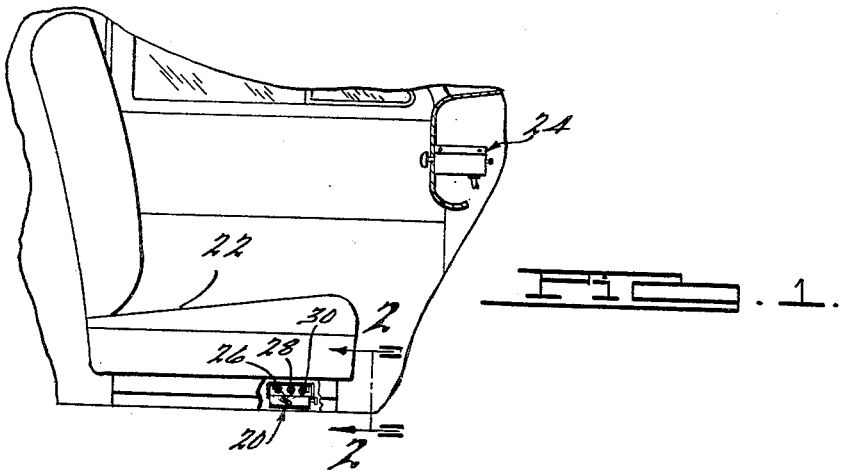
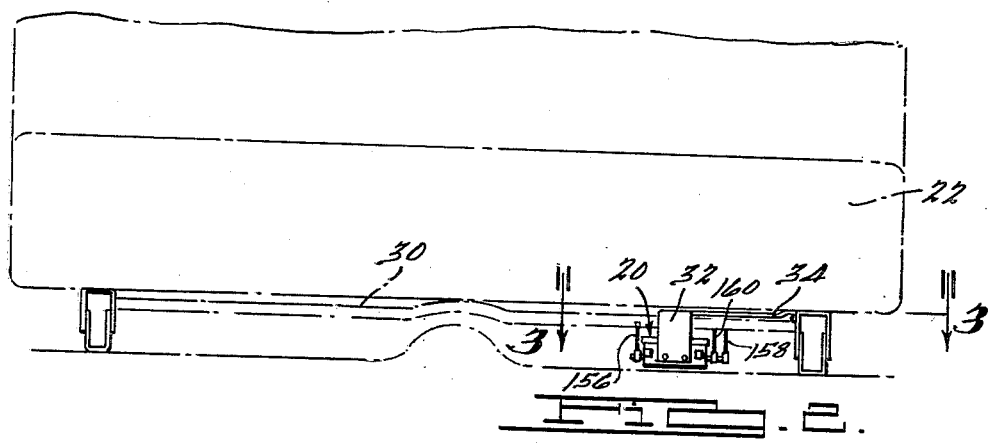
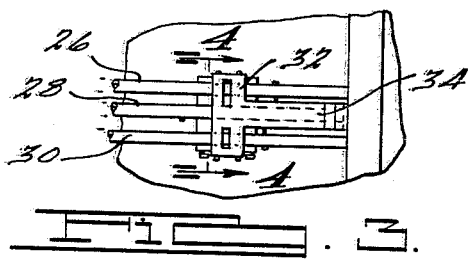
INVENTORS.
Morris R. Steere
Frederick J. Hooven
BY
Harness, Dickey & Pierce
ATTORNEYS.

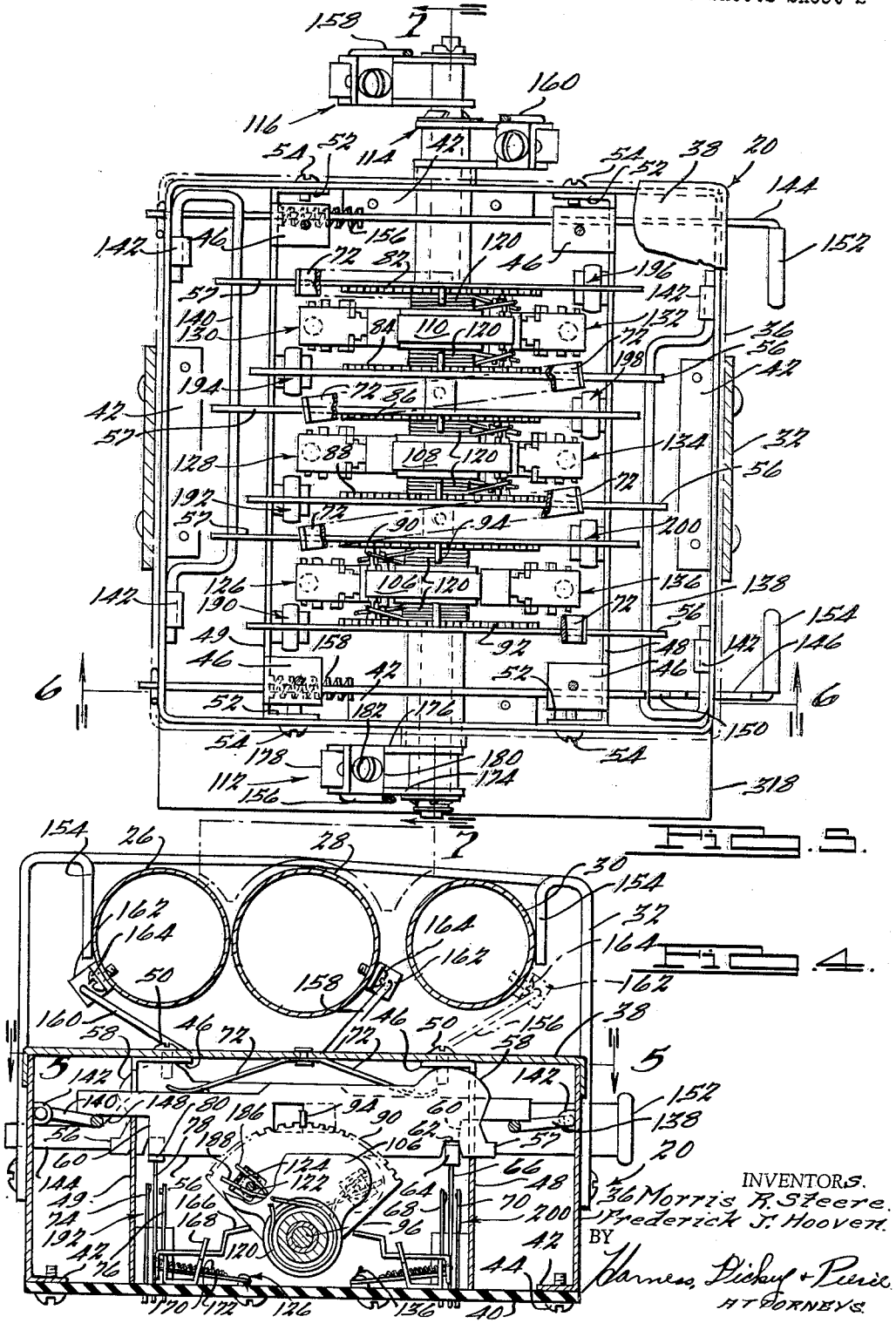

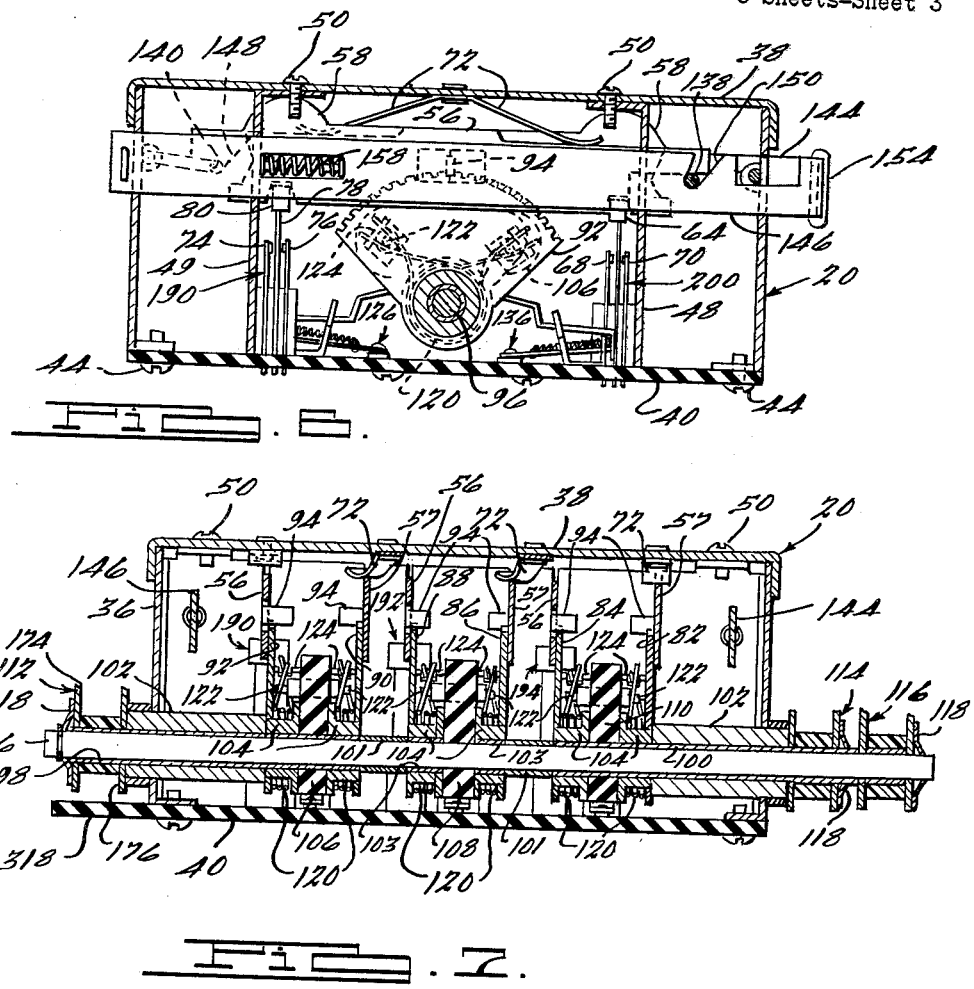

June 2, 1964   M. R. STEERE ETAL   3,135,492
RESETTABLE POSITIONING DEVICE
Filed Feb. 7, 1958   6 Sheets-Sheet 4
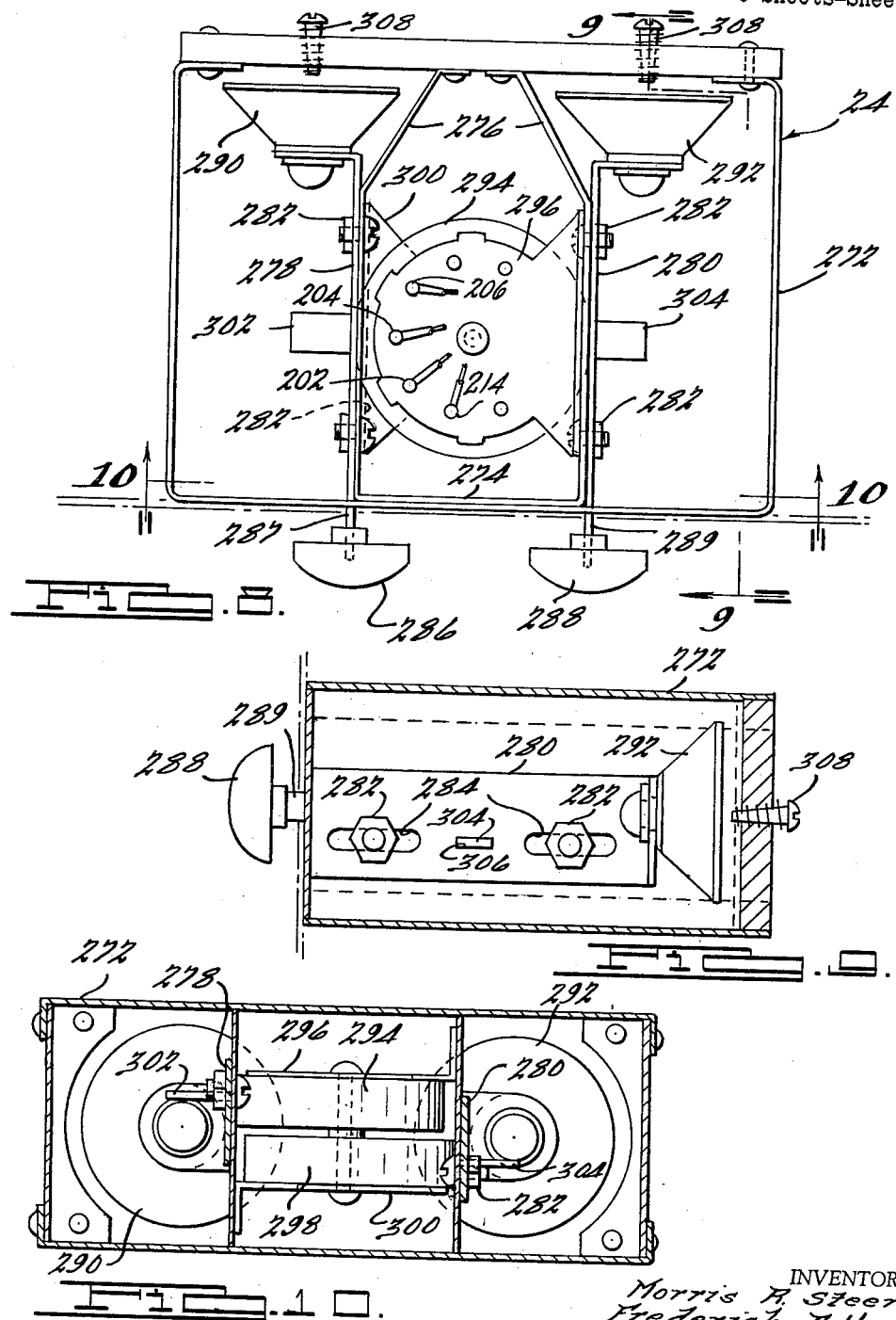
INVENTORS.
Morris R. Steere.
Frederick J. Hooven.
BY
Harness, Dickey & Pierce
ATTORNEYS.

June 2, 1964
M. R. STEERE ETAL
3,135,492
RESETTABLE POSITIONING DEVICE
Filed Feb. 7, 1958
6 Sheets-Sheet 5
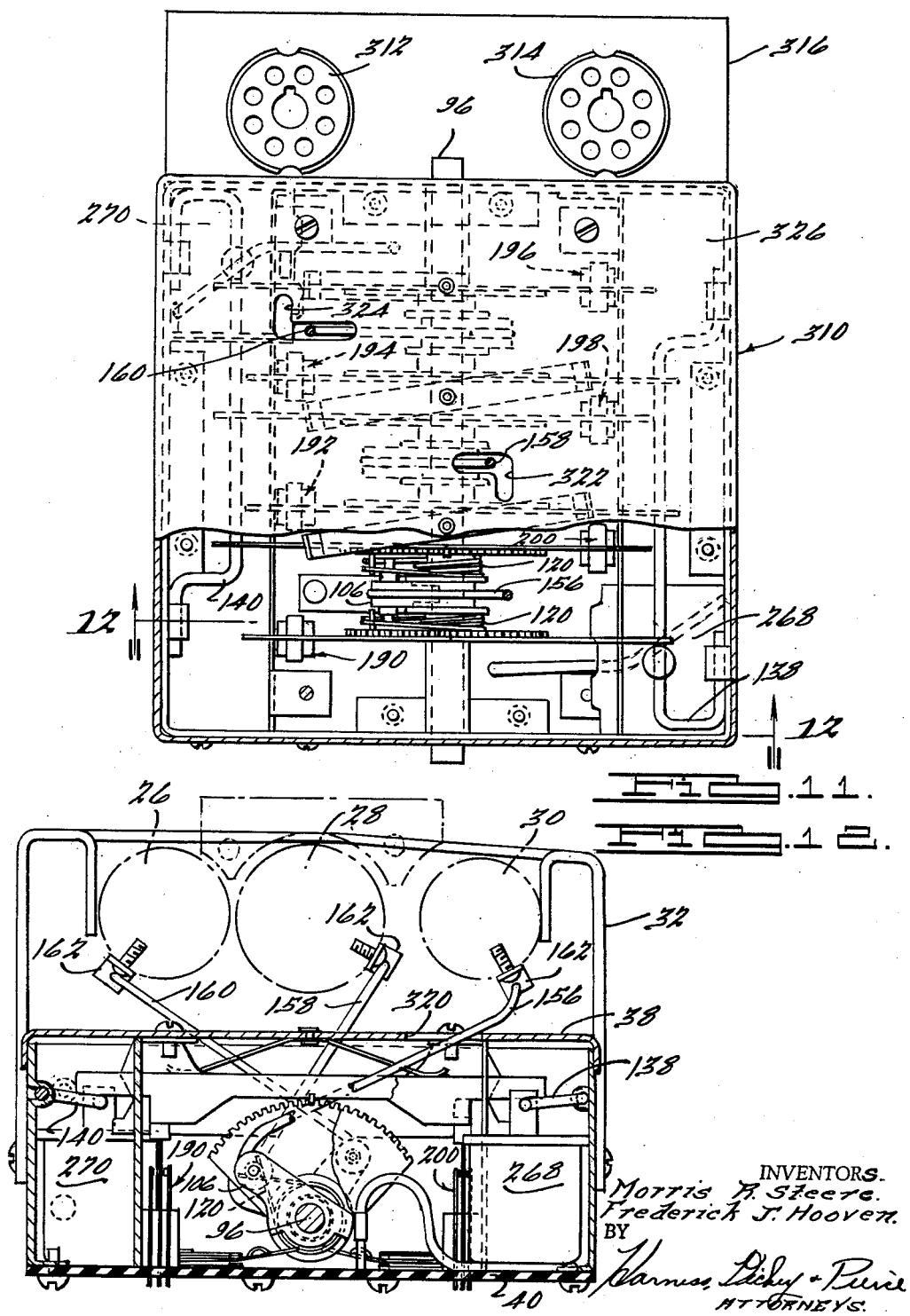
INVENTORS.
Morris R. Steere.
Frederick J. Hooven.
BY
Harness, Dickey & Pierce
ATTORNEYS.

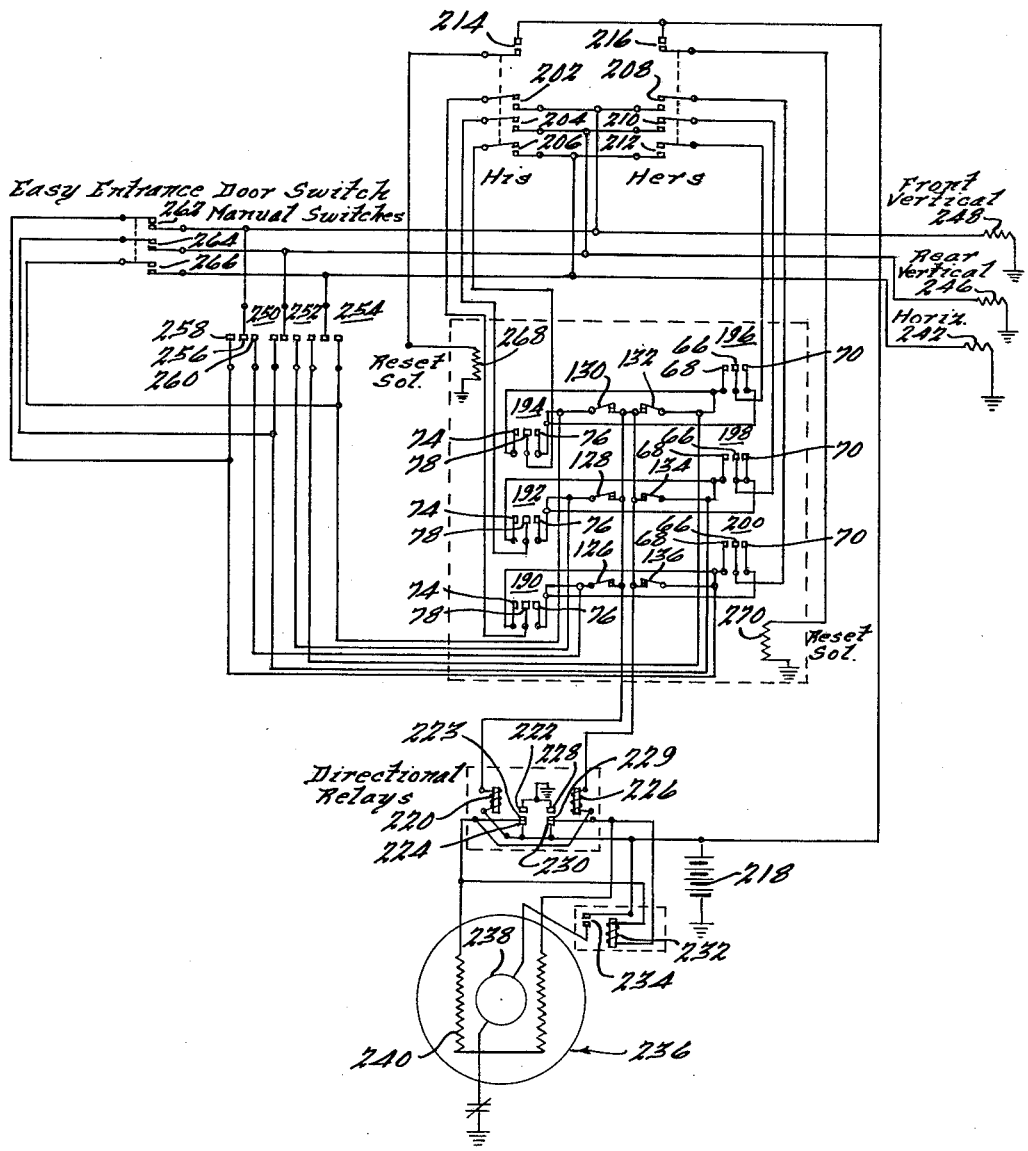

United States Patent Office 3,135,492
Patented June 2, 1964

3,135,492
RESETTABLE POSITIONING DEVICE
Morris R. Steere, Detroit, and Frederick J. Hooven, Bloomfield Hills, Mich., assignors to American Metal Products Company, Detroit, Mich., a corporation of Michigan
Filed Feb. 7, 1958, Ser. No. 713,881
6 Claims. (Cl. 248—394)

This invention relates to power seat mechanisms for automotive vehicles, and particularly to a resettable positioning device for memorizing two predetermined positions of the seat mechanism and automatically controlling the operation of the seat mechanism to selectively arrive at either of the two predetermined positions.

Power seats are becoming increasingly more popular in automotive vehicles today. They permit the seat to be raised or lowered, and moved forward and back in response to the manual actuation of appropriate electrical switches. This generally leads to adjustment of the seat position by each person having occasion to drive the vehicle. For example, in family cars that are driven by both the husband and the wife, the husband may drive with the seat at one position and the wife with the seat at another.

The resettable positioning device of the present invention is adapted to control the operation of power operated seats to, in effect memorize the desired seat positions of both the husband and wife, and to permit the seat to be selectively returned to either of these memorized positions by simply pressing a button. In operation, the man, for example, may actuate the manual electrical switches to move the seat to the position most comfortable for him, both as to height and horizontal position, and then pull what may be aptly designated as a "his" button to actuate the positioning device so that it memorizes the desired position of the seat. Similarly, the woman may move the seat to the position she desires, and pull a "her" button so that the positioning device will memorize this position.

Thereafter, when either the "his" or "her" button is pushed, the positioning device will control the operation of the seat mechanism to automatically move the seat to the memorized position. Further, whenever the operator desires to change either of the memorized positions, the seat is simply moved to the new position desired and either the "his" or "her" button pulled to memorize the new position. In addition, the electrical circuitry of the positioning device is also designed to automatically move the seat to its lower and rearmost position when the door of the automotive vehicle is opened to facilitate getting in and out of the vehicle.

It is one object of the invention to provide a resettable positioning device for automatically controlling the operation of a power seat mechanism for an automotive vehicle.

It is another object of the invention to provide a resettable positioning device for automatically controlling the operation of a power seat mechanism for an automotive vehicle which can memorize two predetermined positions of the seat mechanism and selectively control the seat mechanism to arrive at either of the two predetermined positions.

It is a further object of the invention to provide a resettable positioning device for automatically controlling the operation of a power seat mechanism for an automotive vehicle which can memorize at least two positions of the seat mechanism and thereafter automatically return the seat mechanism to either of the two predetermined positions.

It is a still further object of the invention to provide a resettable positioning device and electrical circuitry for automatically controlling the operation of a power seat mechanism for an automotive vehicle which enables the seat mechanism to be driven to any desired position, enables at least two of the desired positions to be memorized so that the seat may be automatically returned to either of these positions, and automatically drives the seat mechanism to its rearmost and lowermost position in response to the opening of the door of the automotive vehicle to facilitate getting in and out of the vehicle.

It is a still further object of the invention to provide a resettable positioning device which is adapted to receive information from suitable movable elements of the seat mechanism and to control the operation of the seat mechanisms in response to the information received from the aforesaid elements.

It is a still further object of the invention to provide a resettable positioning device which is extremely compact, economical to manufacture, relatively simple in design, and reliable and dependable in operation.

Other objects and features of novelty of the invention will be specifically pointed out or otherwise become apparent when referring, for a better understanding of the invention, to the following description taken in conjunction with the accompanying drawings, wherein:

FIGURE 1 is a broken side of a front seat and dashboard of an automotive vehicle incorporating the resettable positioning device of the invention;

FIG. 2 is an enlarged view of the structure illustrated in FIG. 1, taken along the line 2—2 thereof;

FIG. 3 is a view of the structure illustrated in FIG. 2, taken along the line 3—3 thereof;

FIG. 4 is an enlarged sectional view of the structure illustrated in FIG. 3, taken along the line 4—4 thereof;

FIG. 5 is a sectional view of the structure illustrated in FIG. 4, taken along the line 5—5 thereof;

FIG. 6 is a sectional view of the structure illustrated in FIG. 5, taken along the line 6—6 thereof;

FIG. 7 is a sectional view of the structure illustrated in FIG. 5, taken along the line 7—7 thereof;

FIG. 8 is a plan view of an electrical switch embodying features of the invention;

FIG. 9 is a sectional view of the structure illustrated in FIG. 8, taken along the line 9—9 thereof;

FIG. 10 is a sectional view of the structure illustrated in FIG. 8, taken along the line 10—10 thereof;

FIG. 11 is a plan view of a modification of the resettable positioning device of the invention with the top cover partially broken away;

FIG. 12 is an end view of the structure illustrated in FIG. 11 with the end panel thereof removed; and FIG. 13 is a schematic wiring diagram of the electrical circuitry of the invention.

Referring to FIGS. 1-3, a resettable positioning device 20 embodying features of the present invention is illustrated in position beneath a power-operated front seat 22 of an automotive vehicle with an electrical switch 24 mounted on the dashboard of the vehicle for initiating the operation of the positioning device 20. Of course, if desired, the electrical switch 24 may be mounted anywhere that is convenient such as, for example, on the armrest of the automotive vehicle.

The seat 22 is power operated so that it can be moved forward or backward, and the front and rear ends raised or lowered independently of each other, or raised and lowered together so that the entire seat may be raised and lowered. The seat mechanism for accomplishing this is of the type illustrated in a copending application of Morris R. Steere and Richard J. Williams, Serial No. 481,562, filed on January 13, 1955, now Patent No. 2,857,776, and assigned to the assignee of the present invention wherein a single reversible motor is adapted to drive a lead screw having three running nuts thereon. Three suitable mechanisms, selectively actuated by separate solenoids, are adapted to releasably engage each of the running nuts to prevent their rotation and to transmit the resulting axial movement of the nuts to the seat mechanism to move the seat in the desired manner. For example, one of the aforesaid mechanisms is adapted to releasably engage one of the nuts to raise and lower the rear of the seat, another of the mechanisms releasably engages another of the nuts to raise and lower the front seat, and the third nut is releasably engaged by the third mechanism to move the seat horizontally.

Torque tubes 26, 28 and 30 transmit the movement of the seat mechanism on one side of the seat to the other side so that both sides of the seat move together to prevent cocking or canting of the seat. In the embodiment illustrated, the rotation of the torque tube 26 transmits the horizontal movement of one side of the seat mechanism to the other side thereof, the rotation of the torque tube 28 transmits the movement for raising and lowering the rear of the seat from one side of the seat mechanism to the other, and rotation of the torque tube 30 transmits the movement for raising and lowering the front of the seat from one side of the seat mechanism to the other. The positioning device 20 is mounted on and suspended from the three torque tubes by a bracket 32 having an elongated arm 34 extending therefrom and connected to the side supporting structure of the seat mechanism. In this manner, the positioning device 20 can be connected by suitable control wires 156, 158 and 160 to receive information from each of the torque tubes as to the exact position of the seat mechanism. Of course, it is readily apparent that the torque tubes are not the only elements which can transmit information to the positioning device since it could, for example, be connected to any other suitable elements or linkages of the seat mechanism which move in response to the horizontal, rear vertical, and front vertical position of the seat.

Referring to FIGS. 4–7, the positioning device 20 is comprised of a housing 36 having a top cover panel 38 and a bottom panel 40, the bottom panel being made from insulating material and having printed circuitry thereon for a purpose which will be described in greater detail hereinafter. The bottom panel 40 is affixed to inturned flanges 42 of the housing 36 by suitable self-tapping screws 44, or the like, and the top cover panel 38 is affixed to horizontally disposed flanges 46 of parallel, spaced-apart, internal walls 48 and 49 by suitable screws 50, or the like. The walls 48 and 49 also have vertically extending, interned flanges 52 on both ends thereof to permit the walls to be affixed to the housing 36 by suitable screws 54.

A plurality of oppositely facing locking fingers 56 and 57 are supported within suitable vertical slots in the walls 48 and 49. Each of the locking fingers 56 and 57 has a raised head portion 58 at one end thereof and a shoulder 60 at the other end thereof for engaging the walls 48 and 49 respectively to limit movement of the locking fingers in one direction. A suitable cutout portion 62 is provided beneath the raised head portion 58 of each of the locking fingers for engaging blocks of insulating material 64 and 80 on the ends of blade contacts 66 and 78. Movement of the locking fingers 56 and 57 in a direction toward the walls 49 and 48 respectively is limited by the abutting of the insulating blocks 64 and 80 against the walls.

As stated previously, the locking fingers are so oriented that the head portions 58 of the locking fingers 56 are on one side of the positioning device 20 and the head portions of the locking fingers 57 on the other side thereof. Suitable electrical contacts 68 and 70 cooperate with the blade contacts 66 having the insulating blocks 64 on the ends thereof to form switches 196, 198, and 200, and a plurality of contacts 74 and 76 cooperate with blade contacts 78 to form switches 190, 192, and 194. Each of the switches is supported on, and have leads projecting through, the insulated bottom panel 40, and are adapted to be actuated by the limited movement of the locking fingers 56 and 57.

A plurality of leaf springs 72 are riveted or otherwise secured to the top cover panel 38 so as to resiliently urge each of the locking fingers downwardly. Each leaf spring contacts the end of a locking finger adjacent the shoulder 60, the upward movement of the other end of the locking fingers being limited by the cover panel 38. The spacing between the head portions 58 of the locking fingers and the cover panel 38 is made small enough to insure that the cutout portions 62 will not disengage from the insulating blocks 64 and 80 when the cover panel is in position.

Pairs of gear sector members 82 and 84, 86 and 88, and 90 and 92 are disposed between each pair of locking fingers 56 and 57, and each of the locking fingers has lugs 94 projecting laterally therefrom that are adapted to engage the teeth of the adjacent sector member. As most clearly illustrated in FIG. 7, a shaft 96 passes through the housing 36 and has two separate hollow shafts 98 and 100 slidably disposed thereon with a bushing 102 slidably disposed over each of the hollow shafts to support them in suitable apertures in the walls of the housing 36. Bushings 101 and 103 are provided to space the hollow shafts 98 and 100.

Each of the gear sector members are rigidly affixed, or otherwise keyed, to a bushing 104 and each of the bushings 104 are free to rotate relative to the hollow shafts 98 and 100 and the shaft 96. Cam elements 106, 108 and 110, made from a suitable insulating material, are disposed between each pair of bushings 104, and connectors 112, 114 and 116 are mounted on the shaft 96 and hollow shafts 98 and 100 and retained in axial position by speed nuts 118. The camming element 108 is keyed, or otherwise mounted, for rotation with the shaft 96 as is the connector 116; the camming element 106 and the connector 112 are mounted for rotation with the hollow shaft 98, and the camming element 110 and connector 114 are mounted for rotation with, or otherwise keyed to, the hollow shaft 100. Consequently, rotation of the connector 116 will rotate the shaft 96 and the camming element 108, and rotation of the connectors 112 and 114 will rotate the hollow shafts 98 and 100 respectively which rotate the camming elements 106 and 110 respectively.

A coil spring 120 is disposed about each of the bushings 104 with the ends thereof projecting radially outwardly so as to pass on either side of a lug 122 and a lug 124 projecting from each side of the camming elements, and from each of the gear sector members respectively, the lugs 124 being positioned radially outwardly of the lugs 122 so that each lug 124 overlaps a coresponding lug 122. In this manner, the gear sector members are spring connected for rotation with the camming elements, and will rotate with the camming elements unless they are prevented from rotating by the lugs 94 projecting from the locking fingers 56 and 57. Suitable limit switches 126 through 136 are mounted on the base panel 40 in position to be actuated by the camming elements 106, 108 and 110 when they have been rotated a predetermined amount in either direction.

Clearing bars 138 and 140, formed of bent wire, are pivotally mounted on the housing 36 by collar portions 142 which are stamped from the wall of the housing 36 so as to project inwardly therefrom. It will be observed that the clearing bars 138 and 140 pass under the projecting ends of the locking fingers 56 and 57 respectively so that when the clearing bars are pivoted upwardly they will raise their respective locking fingers to disengage the lugs 94 from the teeth of the gear sector members. Suitable push bars 144 and 146 pass through appropriate slots in the walls of the housing 36 and the walls 48 and 49, and have sloping cam surfaces 148 and 150 respectively which cam the clearing bars 140 and 138 upwardly to clear the appropriate locking fingers when the bars 144 and 146 are pushed inwardly by applying a pressure on the button portions 152 and 154 on the ends thereof. Suitable springs 157 and 159 are mounted on each of the bars 144 and 146 and bear against the internal wall 49 so that when the bars are pushed inwardly, the springs will compress to resiliently return the bars to their original positions when they are released.

As most clearly illustrated in FIG. 4, the positioning device 20 is suspended from the torque tubes 26, 28 and 30 by the mounting bracket 32 which has downwardly extending flanges 155 for centering the mounting bracket relative to the torque tubes. Each of the connectors 112, 114 and 116 are connected to their respective torque tubes by the relatively stiff control wires 156, 158 and 160, the wires being pivotally connected to ears 162 which are fastened directly to the torque tubes by screws 164, or the like. In the embodiment illustrated, the connector 114 is connected to the torque tube 26 which advances and retracts the seat horizontally, the connector 116 is connected to the torque tube 28 which raises and lowers the rear of the seat, and the connector 112 is connected to the torque tube 30 which raises and lowers the front of the seat. Hereafter, these movements will be referred to as horizontal, rear vertical, and front vertical.

When initially connecting the control wires to their respective torque tubes, the seat mechanism is operated by the conventional manual switches to drive it, for example, to its rearmost and lowermost position. This places each of the torque tubes in an extreme position of rotation, the torque tube 26 being rotated to its extreme counterclockwise position, and the torque tubes 28 and 30 being rotated to their extreme clockwise position, as viewed in FIG. 4. The connector 112 is then rotated in a counterclockwise direction until the cam element 106 actuated thereby depresses arm 166 downwardly to break the contacts of the limit switch 126. It will be observed that the left side of cam element 106 has been partially broken away to more clearly illustrate the lugs 122 and 124. Each of the limit switches has an arm similar to the arm 166 which is pivotally mounted on a support 168 so that downward movement of the arm 166 pulls on a spring 170 to flex blade 172 to break the contacts of the limit switch 126. With the connector 112 in this position, the control wire 156, which is pivotally connected to the ear 162 on torque tube 30, is passed through a suitable hole in the side of the connector 112 so that the control wire is pivotally connected to the connector 112.

In a similar manner, the connector 114 is rotated in a clockwise direction until the cam element 110 opens the contacts of the limit switch 132 and at this point the control wire 160 is pivotally connected thereto. Likewise, the connector 116 is rotated in a counterclockwise direction until the cam element 108 opens the contacts of the limit switch 128 and at this point the control wire 158 is pivotally connected thereto. In this manner, the connectors 112, 114 and 116 are connected in predetermined relation to the torque tubes 30, 26 and 28 respectively, and rotation of the torqe tubes in the opposite direction will rotate the cam elements until they actuate the limit switches 136, 130 and 134, as will be described in greater detail hereinafter.

In order to facilitate the initial connection of the control wires to the connnectors 112, 114 and 116 when the torque tubes are in an extreme rotative position so that the cam elements actuate the appropriate limit switches, each of the connectors is made of two separate plates spaced apart by a spacer. Using the connector 112 as illustrated in FIGS. 5 and 7 as an example, it is comprised of a plate 174 which is free to rotate relative to the hollow shaft 98, and a plate 176 which is keyed to the hollow shaft. A flange is formed on one end of the plate 176 having a U-shaped speed nut 178 thereon, and a similar flange 180 is formed on the plate 174. A bolt 182 passes through a suitable aperture in the flange 180 and threadably engages the speed nut 178.

A suitable spring (not shown) is disposed between the flange 180 and speed nut 178 to rotate the plate 174 away from the plate 176. Thus, by adjusting the bolt 182, the angular position of the plate 174 may be changed. In this manner, the connector 112 can be rotated until the cam element 106 actuates the limit switch 126 and, if the control wire 156 does not quite reach its point of connection to the plate 174, or is too long, the plate 174 can be adjusted by the bolt 182 to compensate for this. The control wire 156 is actually pivotally connected to the plate 174 by a hook portion on the end thereof which passes through a suitable aperture (not shown) in the plate 174.

Once the positioning device 20 has been connected to the torque tubes in the above-described manner, the power seat can be advanced by the conventional manual electric switches until it is at the desired position for the driver, which for convenience we may call the "her" position. When the seat has reached this position, of course, the torque tubes 26, 28 and 30 will have correspondingly rotated the connectors 112, 114 and 116 and the cam elements 106, 108 and 110.

Since the lugs 94 of each of the locking fingers 56 and 57 engage the teeth of the sector members 82 through 92, the sector members will not rotate with the cam elements 106, 108 and 110 since they are only connected for rotation with the cam elements by the ends of the coil springs 120 which engage the lugs 122 and 124 of the cam elements and the gear sector members. Referring to FIG. 4 for an example of this, when the cam element 106 is rotated in a clockwise direction due to the actuation of the connector 112 by the counterclockwise rotation of the torque tube 30, end 186 of the spring 120 will be advanced in a clockwise direction by the lug 122 but end 188 of the spring 120 will remain stationary because of the lug 124 which is mounted on the gear sector member 90, the gear sector member 90 being prevented from rotating because the lug 94 engages the teeth thereof.

In a similar manner, each of the cam elements will stress each of the springs 120 so that each of the gear sector members is under spring tension. Consequently, when the desired position of the seat is reached, the pushbutton portion 152 which may be referred to as the "her" button may be pushed to cam the clearing bar 140 upwardly which in turn raises the ends of the locking fingers 57 to disengage the lugs 94 from the teeth of the gear sector members 82, 86 and 90. Once the lugs 94 have been disengaged from the teeth of these gear sector members, they will immediately be pivoted by the aforesaid tension in the coil springs 120 until the ends of each of the coil springs come together as illustrated in FIG. 4. In this manner, the gear sector members are pivoted to the same position as the camming elements 106, 108 and 110 at which point the springs 120 associated therewith are no longer under tension. The push-button 152 may then be released so that the spring 157 will return it to its starting position which lowers the clearing bar 140 and the ends of the locking fingers 57 to permit the lugs 94 to re-engage the teeth of the gear sector members 82, 86 and 90.

This is referred to as the memorized position, and as long as the seat is in this position, the coil springs 120 associated with the gear sector members 82, 86 and 90 will not be stressed, and the locking fingers 57, therefore, will be in what may be termed a neutral position which means that the blade contacts 66 of the switches 196, 198 and 200 will be mid-way between the contacts 68 and 70 so that neither of the contacts are closed. However, once the seat is moved from this position, each of the cam elements will be rotated in a direction depending on the direction of movement of the seat so that the coil springs 120 associated with the gear sector members 82, 86 and 90 will shift the locking fingers 57 either to the right or left so that the blade contacts 66 make contact with either the contacts 68 or 70 of each of the switches 196, 198 and 200.

For example, as most clearly illustrated in FIG. 4, if the front of the seat is lowered, the camming element 106 is rotated in a counterclockwise direction by the clockwise rotation of the torque tube 30 which rotates in response to the lowering of the front of the seat. Therefore, the end 188 of the coil spring 120 will be driven in a counterclockwise direction by the lug 122 which enables the end 186 of the spring to act on the lug 124 to shift the locking finger 57 to the left until the shoulder 60 contacts the wall 49 to prevent further movement to the left. This causes the blade contact 66 to make contact with the contact 68 for a purpose which will be described in greater detail hereinafter. Similarly, if the cam element 106 is rotated in a clockwise direction by raising of the front of the seat and the counterclockwise rotation of the torque tube 30, the locking finger 57 is shifted to the right until the insulating block 64 abuts against the wall 48. This shifts the blade contact 66 against the contact 70 to close the circuitry associated therewith. Consequently, whenever the seat is not in the memorized "her" position, each of the switches 196, 198 and 200 will have the blade contact 66 in contact with either of the contacts 68 or 70 depending upon the direction the seat has been moved from the memorized position.

In a similar manner, the seat may be moved to a second position, which may be referred to as the "his" position, and the button portion 154 pushed inwardly to pivot the clearing bar 138 so as to raise the locking fingers 56 to enable the gear sector members 84, 88 and 92 to be rotated by the coil springs 120 associated therewith to the memorized position. The button portion 154 is then released to lower the locking fingers 56 so that the lugs 94 engage the gear sector members to lock them in the memorized position.

Referring to FIG. 13, the schematic wiring diagram for the positioning device 20 is illustrated. It is comprised of four major portions, the Memory Position and Reset Switches, the Directional Relays for operating the motor, the Manual Switches for operating the power seat to any desired position, and the Easy Entrance Door Switch. The Memory Position and Reset Switches portion of the circuitry will be described first and includes the switches 190, 192 and 194 which are actuated by the locking fingers 56, the switches 196, 198 and 200 which are actuated by the locking fingers 57, contacts 202 through 212 which are physically located in the switch 24 illustrated as being mounted on the dashboard in FIG. 1, the limit switches 126 through 136, battery 218, relay 220 for actuating moving contact 223 between contacts 222 and 224, relay 226 for actuating moving contact 229 between contacts 228 and 230, relay 232 for closing and opening contacts 234, and a full shunt motor 236 having an armature 238 and field winding 240.

The contacts 202 through 206 are actuated simultaneously by one push-button which again is referred to as the "his" button, and the contacts 208 through 212 are actuated by another button which again is referred to as the "her" button. Contacts 214 and 216 are also illustrated as being actuated by the "his" and "her" buttons respectively when either of the buttons are pulled outwardly, or in the opposite direction from that necessary to actuate the contacts 202 through 212. The purpose of contacts 214 and 216 will be described in greater detail hereinafter.

Assuming for the purpose of illustration that a "his" position for the seat has already been selected and memorized by the positioning device as previously described, and further assuming that the seat has been moved from the memorized position, the movable contact 78 of each of the switches 190, 192 and 194 would be in contact with either the contact 74 or 76 thereof depending upon the direction in which the seat is displaced from the memorized position. By way of example, if the front and rear of the seat are above the "his" position, the contacts 78 and 74 of switches 190 and 192 would be closed, and if the seat is forward of the desired position, the contacts 78 and 76 of the switch 194 would be closed.

Under these conditions, the "his" portion of the diagram is entirely out of the memorized position and, therefore, when the "his" button on the switch 24 of FIG. 1 is pressed, the contacts 202, 204 and 206 will close to automatically move the seat to the memorized "his" position. This occurs in the following manner. When the contact 202 is closed, it completes a circuit through contacts 78 and 74 of switch 190 through the limit switch 136 to the relay 226 and thence through contacts 223 and 224 to the positive side of the battery 218. Similarly, closing contacts 204 completes the circuit from the contacts 78 and 74 of the switch 192, to the limit switch 134, and thence through the relay 226 and to the battery in the previously described manner. However, the closing of the contacts 206 completes the circuit through the contacts 78 and 76 of the switch 194 and through the limit switch 130 to energize the relay 220, the circuit from the relay 220 passing directly to the positive side of the battery 218.

When the relay 220 is energized, it will open contact 224 and close contact 222 to de-energize the relay 226 since its circuit to the positive side of the battery 218 is completed through the contact 224 and, therefore, the relay 226 will never be energized while the relay 220 is energized. Because of this, the relay 220 is referred to as the master relay.

When the relay 220 is energized, current will pass through the field winding 240 of the motor 236 since one side of the field winding is connected to ground through the contacts 222 and 223 and the other side of the field winding is connected to the positive side of the battery 218 through the contacts 229 and 230 which are closed because the relay 226 is de-energized by virtue of the fact that the relay 220 is energized as previously described. As soon as the circuit is completed through the field windings 240 of the motor 236, the relay 232 will also be energized since it is connected in parallel with the field winding. The energization of the relay 232 closes the contacts 234 to complete the circuit from the positive side of the battery 218, through contacts 234, through the armature 238 and thence to ground. This enables the heavier armature current to be carried on a separate circuit and to be turned on and off in response to the turning on and off of the lighter current through the field winding 240.

Tracing the circuitry back from the contact 78 of the switch 194 to the contacts 206, it will be observed that a path is completed from the contacts 206 through the solenoid 242 to ground. This energizes the solenoid 242 which actuates the plunger that engages the horizontal running nut to physically prevent it from rotating so that it runs axially on the lead screw which is rotated by the motor 236 to move the seat rearwardly as previously described. When the seat reaches the memorized "his" horizontal position, the contact 78 will break contact with the contact 76 of the switch 194 because the coil spring 120 associated with the gear sector member 84 will no longer force it to the right as viewed in FIG. 5, but will rather permit the locking finger 56 associated therewith to move slightly to the left to its "at rest" position so that the contact 78 is midway between the contacts 74 and 76. This satisfies the memorized condition of the gear sector member 84 and breaks the circuit through the switch 194 which de-energizes the relay 220 and stops the operation of the motor 236.

However, since the contacts 74 and 78 of the switches 190 and 192 are still closed because the gear sector members 92 and 88 are in an unsatisfied condition and consequently urge their respective locking fingers 56 to the left due to the action of their related coil springs 120, the relay 226 will immediately become energized since the contacts 223 and 224 are closed, as soon as the relay 220 is de-energized, to complete a circuit to the positive side of the battery 218. When the relay 226 is energized, the moving contact 229 breaks with the contact 230 and makes contact with the contact 228 which completes a ground circuit of the field winding 240 from the battery to ground in a reverse direction from the circuit formerly completed through contact 222. This causes the motor 236 to again be energized so as to rotate in a reverse direction. Of course, as soon as the current commences passing through the field winding 240, the relay 232 will be energized as before to close the contacts 234 to enable the heavier armature current to pass through the armature 238 as previously described. Similarly, as previously described, as soon as the circuit is completed through switches 190 and 192, the circuit will be completed through switches 204 and 202 to ground through solenoids 248 and 246, respectively. Energizing the solenoids 246 and 248 actuates a suitable mechanism to physically engage the running nuts which move the rear vertical and forward vertical linkages of the seat mechanism respectively. Consequently, the rear and forward ends of the seat will begin to move downward.

Assuming that the coil spring 120 associated with the gear sector member 88 reaches the satisfied position first, the contact 78 of the switch 192 will reach the neutral position first which will break the circuit to the solenoid 246 to halt the downward movement of the rear of the seat. However, the circuit to the solenoid 248 will still be complete and the front of the seat will continue to move downwardly until the gear sector member 92 reaches a satisfied position at which time the contact 78 of the switch 190 will reach the neutral position to break the circuit. This stops the rotation of the motor and also de-energizes the solenoid 248 which immediately stops the lowering of the front end of the seat at the memorized position.

In the example just explained, the seat was forward and above the memorized position. Now assuming again, by way of example, that the seat is above and to the rear of the memorized position, the switches 190 and 192 would be in the same position as before with the contacts 78 and 74 closed, but the switch 194 would be reversed so that the contacts 78 and 74 would be closed. Consequently, when the "his" button of the switch 24 of FIG. 1 is pressed, the contacts 202, 204 and 206 close, and the relay 226 is energized to close the contacts 228 and 229 and complete the circuit of the motor 236 from battery to ground. The motor will continue to run until each of the contacts 78 of the switches 190, 192 and 194 reach the neutral position. Under this set of conditions, the master relay 220 is never energized. Conversely, if the contacts 76 and 78 of all the switches 190, 192 and 194 were closed, which would mean that the seat is to the rear and below the memorized positions, only the relay 220 is energized to start the motor 236. However, it is to be understood that if the contacts 78 and 76 of any of the switches 190, 192 and 194 are closed, they will control the initial direction of rotation of the motor since they energize the relay 220 which breaks contacts 224 and 223 to interrupt the circuit of the relay 226 to the battery. Therefore, the motor 236 will always first start operating in the direction controlled by the relay 220, if it is energized, and then will reverse itself when the relay 226 is energized. Thus, by a very simple and inexpensive circuit containing only two relays, the direction of rotation of the motor which controls the axial direction of movement of the running nuts is effectively and reliably determined.

The "her" portion of the circuitry, which includes the contacts 208, 210 and 212 operated by the "her" button on the switch 24 of FIG. 1, and which also includes the switches 196, 198 and 200, operates in the same manner as the "his" portion of the circuit diagram and, therefore, will not be explained in complete detail. It is apparent that when the contacts 66 of the switches 196, 198 and 200 are closed with either of the contacts 68 or 70 thereof, the circuit to the motor 236 will be completed through either of the relays 220 or 226 and the contacts operated thereby, and also to the solenoids 242, 246 and 248 which actuate the mechanisms engaging the three running nuts, in exactly the same manner as previously described, as soon as the contacts 208, 210 and 212 are closed by pushing the "her" button on the switch 24 of FIG. 1. Therefore, the sector members 82, 86 and 90 may be set to a second memorized position, for a woman driver for example, and locked therein by the fingers 57. This position will be automatically attained in the manner previously described when the "her" button of the switch 24 is pushed to close the contacts 208, 210 and 212.

Since each of the three running nuts which actuate the appropriate linkages for the horizontal, rear vertical and front vertical position of the seats operate on one lead screw which is actuated by the motor 236, the nuts must be limited as to the sector or portion of the lead screw over which they are free to run. To accomplish this, the limit switches 126 through 136 are connected into the circuitry leading from each of the switches 190 through 200 to the relays 220 and 226 so that when the running nuts reach the limits of their travel, the appropriate limit switch will be energized to break the circuit to the motor. Of course, two limit switches must be provided for each running nut, one on either side of each nut, and are physically located in the positioning device 20, as indicated most clearly in FIG. 5. The limit switches are adapted to be actuated by the camming elements 106, 108 and 110 when they reach the desired maximum angle of rotation in either direction. At either of these points, the camming elements will contact the actuating arms of the limit switches to open the contacts 126 and 136.

As previously described, when first connecting the positioning device 20 to the torque tubes 26, 28 and 30, the seat mechanism is driven to an extreme position so that each of the torque tubes are rotated to a maximum angular position in one direction. Each of the connectors 112, 114 and 116 are then rotated in the appropriate direction so that the cam element actuated thereby opens the contacts of the appropriate limit switch. The control wires 156, 158 and 160 are then connected to the connectors while they are in this position. Consequently, when the torque tubes are again rotated in this direction by the running nuts which actuate the linkages which in turn rotate the torque tubes, they cannot rotate any further than this point since the camming elements will open the contacts of the appropriate limit switches to interrupt the circuit of the particular running nut to the motor 236.

Likewise, when the torque tubes rotate a predetermined amount in the other direction so that the camming elements actuated thereby reach the other extreme position, the contacts of the appropriate limit switches on the opposite side of the cam elements will be actuated to interrupt the circuitry to the motor and stop the movement of the seat.

In order to permit the seat to be advanced to positions other than the two memorized "his" and "her" positions, manual switches 250, 252 and 254 are provided. As illustrated in FIG. 13, the switch 250 is connected in parallel with the switches 202 and 199, the switch 252 is in parallel with the switches 204 and 192, and the switch 254 is in parallel with the switches 206 and 194. Each of the manual switches have a movable contact 256, as illustrated on the switch 250, which is adapted to be manually shifted to the left to close the circuit through the contact 258 or to the right to complete the circuit through the contact 260. Using the switch 250 as an example, when the contacts 256 and 258 are closed, the circuit is completed between the solenoid 248, which is adapted to engage the running nut for raising and lowering the front of the seat and the relay 226 through the limit switch 136. When the movable contact 256 closes with the contact 260, the circuit is completed between the solenoid 248 and the relay 220 through the limit switch 126 to reverse the direction of rotation of the motor 236. The switches 252 and 254 similarly connect either of the relays 220 and 226 and the solenoids 246 and 242 respectively for raising and lowering the rear of the seat and controlling the forward and rearward horizontal movement of the seat. Of course, the manual switch 252 would energize the relays 220 and 226 through either of the limit switches 128 and 134 respectively and the manual switch 254 would energize the relays 220 and 226 through either of the limit switches 130 or 132 respectively. In this manner, if either of the switches are held in one position long enough to drive the seat too far in one direction, the appropriate limit switch will be opened by the appropriate camming elements 106, 108 or 110 to interrupt the circuit to the motor 236.

In order to enable a person to get in and out of the automotive vehicle with as much ease as possible, contacts 262, 264 and 266 are provided. These contacts are adapted to be simultaneously closed when the door of the automotive vehicle is opened and to be simultaneously opened when the door of the automotive vehicle is closed. Therefore, when the door is opened, the contacts are closed and the circuit is completed between the solenoid 242 and the motor 236 through the relay 220 after which it will be completed between solenoids 246 and 248, and relay 226 to the motor so that the seat automatically moves to its lowermost and rearmost position. This provides the maximum amount of room to facilitate getting in and out of the automotive vehicle.

If desired, two reset solenoids 268 and 270 may be provided which are adapted to be actuated by the contacts 214 and 216 which in turn may be operated by pulling the "his" or "her" buttons respectively of the switch 24 illustrated in FIG. 1. The reset solenoid 268 is physically located within the positioning device 20 beneath the clearing bar 138 so that when it is energized, it will raise the clearing bar 138 which in turn raises each of the locking fingers 56 to disengage the lugs 94 thereon from the teeth of the gear sector members 84, 88 and 92 to permit the resetting of the memorized "his" position. The reset solenoid 270 is similarly located beneath and connected to the clearing bar 140 for lifting the locking fingers 57 to permit the resetting of the memorized "her" position. The reset solenoids 268 and 270 permit the clearing bars 138 and 140 to be lifted by actuating the "his" and "her" buttons of switch 24 on the dashboard, or other remote position, as opposed to having to reach down and push the "his" and "her" buttons 152 and 154 on the positioning device 20 itself. Otherwise, the resetting of the memorized positions is accomplished in exactly the same manner as previously described.

Referring to FIGS. 8 through 10, the switch 24 which is illustrated in FIG. 1 as being mounted on the dash but which may also be mounted on the armrest or any other suitable position, is comprised of a housing 272 having a generally U-shaped bracket 274 mounted therein with diagonally inwardly extending end portions 276 on the legs thereof. Two plates 278 and 280 are slidably mounted on the straight portions of the legs of the U-shaped bracket 274 by bolts and nuts 282, or the like. The plates 278 and 280 are provided with suitable slots 284 to permit limited sliding movement relative to the bracket 274. Two buttons 286 and 288 are affixed to corresponding reduced portions 287 and 289 on the ends of the plates 278 and 280 respectively, and two rubber suction cups 290 and 292 are mounted on the right angle flanges on the other end of the plates 278 and 280 respectively. An insulated disc 294 is rotatably mounted on the bracket 274 by a bracket 296, using the nuts and bolts 282 for the purpose of economy, and a second disc 298 is rotatably mounted on the bracket 274 by a bracket 300. A lug 302 projects radially outwardly from the disc 294 and passes through a suitable elongated slot in the leg of the bracket 274 and through a slot in the sliding bracket 278 so that movement of the sliding bracket in either direction will rotate the disc 294 accordingly. Likewise, a lug 304 projects radially outwardly from the disc 298 and passes through an elongated slot in the other leg of the bracket 274, and through a slot 306 in the sliding bracket 280 so that sliding movement of the bracket 280 will rotate the disc 298.

In this manner, the button 286 may serve as the "his" button and the button 288 as the "her" button. The "his" button 286 may then be pushed inwardly until the suction cup sticks to the back wall of the housing 272 which orients contacts on the disc 294 with the contacts on the bracket 296 which may be suitably connected to serve as the contacts 202, 204 and 206 illustrated in FIG. 13 to initiate the movement of the seat to the memorized "his" position. The disc 294 may also be spring mounted by suitable springs (not shown) so that it is resiliently urged to a normal position wherein none of the contacts are closed. Likewise, the "her" button 288 may be depressed until the suction cup 292 sticks to the back wall of the housing 272 to rotate the disc 298 which engages contacts thereon with contacts on the bracket 300. These contacts may be wired to serve as contacts 208, 210 and 212 of FIG. 13 to initiate the movement of the seat to the memorized "her" position.

Tapered screws 308 may be provided in the back wall of the housing 272 and adjusted to serve as bleeder ports which will permit the escape of air into the suction cups when they are stuck on the back wall of the housing 272. These screws may be adjusted so that each of the cups will stick to the back wall for a period of about eight seconds which would provide a sufficient time to permit the seat to reach either the "his" or "her" position. Thus, the person operating the switch 24 does not have to hold the "his" or "her" buttons 286 and 288 in a depressed position until the seat reaches the memorized position.

The contacts 214 and 216 of FIG. 13 may also be appropriately positioned on the disc 294 and bracket 296, and the disc 298 and bracket 300 respectively so that when the "his" button is pulled out a short distance the disc 294 will rotate in the reverse direction to close the contacts 214 to energize the reset solenoid 268 to reset the memorized "his" position, and similarly, the "her" button 288 may be pulled out to rotate the disc 298 in the reverse direction to permit contacts 216 to be closed to energize the reset solenoid 272 to permit the "her" position to be reset. Of course, the switch 24 as illustrated in FIGS. 8, 9 and 10, and shown as mounted on the dash in FIG. 1, is not the only type of switch which can be used since it is obvious that many other type switches can also be arranged to serve a similar function. For example, a plurality of blade-type switches may be mounted together and the blades connected so that when a button is pushed in one direction contacts equivalent to the contacts 202, 204 and 206 of FIG. 13 would be closed and when it is pulled in the reverse direction, contacts 214 would be closed. Similar blade-type switches could be provided to fulfill the function of contacts 208, 210, 212 and 216 of FIG. 13.

Referring to FIGS. 11 and 12, a positioning device 310 is illustrated which is slightly different from the positioning device 20 previously described in that each of the control wires 156, 158 and 160 pass through slots 320, 322, and 324 in top cover 376 and are connected directly to the cam elements 106, 108 and 110 respectively, as opposed to being connected to the connectors 112, 116 and 114 respectively. With this construction, only the shaft 96 need be provided, the hollow shafts 98 and 100 being unnecessary since the cam elements are merely rotatably mounted directly on the shaft 96 and are actuated directly by the control wires. As previously described when the connectors 112, 114 and 116 are employed each of the cam elements must be keyed for rotation with the shaft 96 or hollow shafts 98 and 100 and the connector actuating the particular cam element must also be keyed to the same shaft.

By connecting the cam elements directly to the control wires 156, 158 and 160, it is apparent that the construction of the positioning device 310 is simplified to some extent. However, it will be appreciated that applications may arise wherein it would not be convenient to bring the control wires 156, 158 and 160 directly from the cam elements and through the top cover of the positioning device due to the construction of the particular seat mechanism with which it is employed. In these situations it is preferable to use the positioning device 20 with the end connectors 112, 114 and 116 since they are more versatile and can be more easily hooked or connected to other elements of the seat mechanism such as the moving linkages rather than the torque tubes, for providing information as to the position of the seat to the positioning device.

Further, it will be observed that in the positioning device 310 the push bars 144 and 146 for actuating the clearing bars 138 and 140 have been omitted. Instead reset solenoids 268 and 270 are disposed within the positioning device 310 beneath the clearing bars 138 and 140 respectively, and are pivotally connected to each of the clearing bars. Consequently, when the reset solenoids are actuated by pulling on the "his" or "her" buttons of the switch 24 to close the contacts 214 and 216 thereof respectively, the clearing bars are pivoted upwardly to lift the locking fingers 56 or 57 resting thereon to permit the memorized position to be reset in exactly the same manner as previously described. By employing the reset solenoids the operator can reset the memorized position by actuating the switch 24 which can be conveniently mounted on the dashboard or armrest as previously described, as opposed to having to actuate the "his" or "her" buttons 154 and 152 to reset the positioning device 20, the latter, of course, necessarily having to be located on the positioning device 20 itself.

Further, as illustrated in FIG. 11, two electrical sockets 312 and 314 are mounted on an extended portion 316 of the insulated bottom panel 40 and are electrically connected with the limit switches 126 through 136 and the switches 190 through 200 as well as with the reset solenoids 268 and 270 by suitable printed circuitry provided on the bottom of the insulated bottom panel 40. In this manner, the necessary connections can be made to the positioning device 310 by merely inserting the appropriate electrical plug in the sockets 312 and 314.

It will be observed that in the positioning device 20 previously described, the sockets 312 and 314 are not provided, however, one end of the bottom panel 40 thereof is extended to provide an extended portion 318. With this construction, each of the lines of the printed circuitry on the bottom panel 40 are brought out in parallel relation so that they terminate on the end portion 318, and a suitable female socket member is mated directly with the end portion 318 so that the electrical connections thereto engage the appropriate lines of the printed circuitry on the end portion 318.

From the above description, it is apparent that the present invention provides a very simple, economical, compact and reliable positioning device for automatically controlling the power operation of the seat of an automotive vehicle. The positioning device enables the seat to be moved to any desired position by manual switches, automatically moved to memorized "his" or "her" positions by simply pressing a "his" or "her" button, and also moves the seat to its rearmost and lowermost position each time the door is opened to facilitate getting into and out of the automotive vehicle.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, although the positioning device of the present invention has been illustrated as controlling the operation of a power seat for an automotive vehicle, it is readily apparent that the device is equally capable of controlling the operation of other mechanisms or machines wherein the information as to the movement of the mechanisms can be transmitted to the positioning device.

What is claimed is:

1. A resettable positioning device for controlling the operation of a power operated seat mechanism comprising a housing, a plurality of camming elements and gear sector members pivotally mounted within said housing, each of said gear sector members being resiliently connected to one of said camming elements for movement therewith, locking means for releasably engaging the teeth of the gear sector members in a manner to limit their movement with the camming elements in either direction, reset means for disengaging and engaging said locking means with the gear sector members, a plurality of electrical switches mounted within said housing each adapted to be actuated in response to the limited movement of one of the gear sector members, means for connecting each of said camming elements for movement in response to a predetermined direction of movement of said seat mechanism, and control means responsive to the position of the electrical switches for controlling the actuation of said mechanism, said connecting means comprising a plurality of coaxial shafts extending through said housing, each of said camming elements being pivotally mounted on a different one of said shafts for rotation therewith, and each of said gear sector members being pivotally mounted on said shafts for rotation relative thereto, a connector keyed to each of the shafts, and control wire means adapted to connect each of the connectors to predetermined elements of said mechanism whereby each of the camming elements is adapted to be pivoted in response to movement of the predetermined elements of the mechanism.

2. A resettable positioning device for controlling the operation of a power operated seat mechanism comprising a housing, a plurality of camming elements pivotally mounted within said housing, a gear sector member pivotally mounted within said housing on either side of each of the camming elements, spring means connecting each of said gear sector members to the adjacent camming element for movement therewith, two groups of locking fingers mounted within said housing in a manner to permit limited linear movement thereof, one group of locking fingers engaging the teeth of the gear sector members on one side of the camming elements and the other group of locking fingers engaging the teeth on the other side of the camming elements to limit the pivoting thereof, reset means for raising and lowering each group of the locking fingers to disengage and engage them with the teeth of the gear sector members, two groups of electrical switches disposed within said housing each adapted to be actuated by the limited linear movement of one of the locking fingers of a corresponding group of locking fingers, means adapted to connect each of said camming elements for movement in response to a predetermined direction of movement of said seat mechanism, and electrical switch means adapted to initiate the actuation of said seat mechanism controlled by the position of the electrical switches of each group, each of the locking fingers of one group having an extended portion on one end thereof positioned on one side of the housing, and each of the locking fingers of the other group having an extended portion on one end thereof positioned on the other side of the housing, and said reset means comprising a clearing bar pivotally mounted on each side of the housing, each clearing bar passing transversely beneath the extended portions of each of the groups of locking fingers, and means for pivoting each of the clearing bars to raise each group of locking fingers contacted thereby to disengage them from the gear sector members associated therewith, said means comprising two spaced apart push bars extending through said housing from said one side to the other, a sloping cam surface on one of said push bars engaging one of said clearing bars and a sloping cam surface on the other of said push bars engaging the other of said clearing bars whereby linear movement of either push bar will cam the clearing bar associated therewith upwardly to disengage the locking fingers from the gear sector members.

3. A resettable positioning device for controlling the operation of a power operated seat mechanism comprising a housing, a plurality of camming elements pivotally mounted within said housing, a gear sector member pivotally mounted within said housing on either side of each of the camming elements, spring means connecting each of said gear sector members to the adjacent camming element for movement therewith, two groups of locking fingers mounted within said housing in a manner to permit limited linear movement thereof, one group of locking fingers engaging the teeth of the gear sector members on one side of the camming elements and the other group of locking fingers engaging the teeth on the other side of the camming elements to limit the pivoting thereof, reset means for raising and lowering each group of the locking fingers to disengage and engage them with the teeth of the gear sector members, two groups of electrical switches disposed within said housing each adapted to be actuated by the limited linear movement of one of the locking fingers of a corresponding group of locking fingers, means adapted to connect each of said camming elements for movement in response to a predetermined direction of movement of said seat mechanism, and electrical switch means adapted to initiate the actuation of said seat mechanism controlled by the position of the electrical switches of each group, each of the locking fingers of one group having an extended portion on one end thereof positioned on one side of the housing, and each of the locking fingers of the other group having an extended portion on one end thereof positioned on the other side of the housing, and said reset means comprising a clearing bar pivotally mounted on each side of the housing, each clearing bar passing transversely beneath the extended portions of each of the groups of locking fingers, and means for pivoting each of the clearing bars to raise each group of locking fingers contacted thereby to disengage them from the gear sector members associated therewith, said means comprising a first solenoid mounted within said housing and adapted to actuate one of said clearing bars, and a second solenoid mounted within said housing and adapted to actuate the other of said clearing bars whereby energization of either solenoid pivots the clearing bar actuated thereby to disengage the locking fingers associated therewith from their respective gear sector members.

4. In a resettable positioning device for controlling the operation of a power operated seat mechanism capable of moving a seat horizontally and raising and lowering the front and rear of the seat independently, a housing, first, second and third camming elements pivotally mounted within said housing, means adapted to actuate said camming elements in response to the horizontal, rear vertical and front vertical movement of the seat respectively, first, second and third gear sector members pivotally mounted within the housing and spring connected to the first, second and third camming elements respectively so as to normally pivot therewith, first, second and third locking fingers mounted within said housing in a manner to permit limited linear movement thereof and engaging the teeth of the first, second and third gear sector members respectively to limit the pivoting thereof in either direction with the camming elements, each locking finger being spring biased in one direction or the other as long as the camming element associated therewith is not in the same angular position as the gear sector element associated therewith, first, second and third electrical switches mounted within said housing adjacent each of the locking fingers, each of said switches comprising a first and second fixed contact with a movable blade contact therebetween, each movable blade contact being engaged by the first, second and third locking fingers respectively so as to be positioned midway between the fixed contacts when the locking finger is not under a spring bias and to be in contact with either the first or second fixed contact when the locking finger is spring biased in either direction, said positioning device determining the movement of the horizontal, rear vertical and front vertical position of the seat mechanism controlled by the position of the first, second and third movable blade contacts respectively, including electrical means adapted to be operated in either of two directions to selectively change the horizontal, rear vertical and front vertical position of the seat, a single throw triple pole switch, and three separate circuits for energizing said electrical means, each of said circuits having one of said electrical switches and a set of contacts of the triple pole switch connected in series therein whereby when the triple pole switch is closed the electrical means capable of actuating the seat mechanism in a manner determined by the position of the blade contact of each of the electrical switches until a horizontal, front, and rear vertical position of the seat is reached wherein the first, second and third camming elements adapted to be actuated by these movements reach the locked position of the first, second and third gear sector members respectively which moves the movable contact of each electrical switch to said midway position to de-energize said electrical means.

5. In a resettable positioning device for controlling the operation of a power operated seat mechanism capable of moving a seat horizontally and raising and lowering the front and rear of the seat independently, a housing, first, second and third camming elements pivotally mounted within said housing, means adapted to actuate said camming elements in response to the horizontal, rear vertical and front vertical movement of the seat respectively, first, second and third gear sector members pivotally mounted within the housing and spring connected to the first, second and third camming elements respectively so as to normally pivot therewith, first, second and third locking fingers mounted within said housing in a manner to permit limited linear movement thereof and engaging the teeth of the first, second and third gear sector members respectively to limit the pivoting thereof in either direction with the camming elements, each locking finger being spring biased in one direction or the other as long as the camming element associated therewith is not in the same angular position as the gear sector element associated therewith, first, second and third electrical switches mounted within said housing adjacent each of the locking fingers, each of said switches comprising a first and second fixed contact with a movable blade contact therebetween, each movable blade contact being engaged by the first, second, and third locking fingers respectively so as to be positioned midway between the fixed contacts when the locking finger is not under a spring bias and to be in contact with either the first or second fixed contact when the locking finger is spring biased in either direction, said positioning device determining the movement of the horizontal, rear vertical and front vertical position of the seat mechanism controlled by the position of the first, second and third movable blade contacts respectively, said seat mechanism including first, second and third elements movable in response to the changing horizontal, rear vertical and front vertical position of the seat respectively, a reversible electric motor adapted to actuate said seat mechanism, a first, second and third solenoid means adapted to selectively control the horizontal, rear vertical and front vertical position of the seat respectively, an electrical circuit for energizing the motor including two directional relays for controlling the direction of rotation of the motor, a triple pole single throw switch having the first set of contacts thereof connected in series with said first solenoid means and the movable contact of said first electrical switch, the second sets of contacts thereof connected in series with said second solenoid means and the movable blade contact of the second electrical switch and the third set of contacts connected in series with said third solenoid means and the movable blade contact of the third electrical switch, said first fixed contacts of each of the electrical switches being connected in series with one of the directional relays and the second fixed contacts of each of the electrical switches being connected in series with the other of the directional relays, one of said directional relays being a master relay to take preference in controlling the direction of rotation of the electric motor whereby when the contacts of the triple pole switch are closed the seat will move until it reaches a horizontal, rear vertical and front vertical position wherein the first, second and third camming elements respectively reach the same angular position as the locked gear sector members associated therewith.

6. In a resettable positioning device for controlling the operation of a power operated seat mechanism capable of moving a seat horizontally and raising and lowering the front and rear of the seat independently, a housing, first, second and third camming elements pivotally mounted within said housing, means adapted to actuate said camming elements in response to the horizontal, rear vertical and front vertical movement of the seat respectively, first, second and third gear sector members pivotally mounted within the housing and spring connected to the first, second and third camming elements respectively so as to normally pivot therewith, first, second and third locking fingers mounted within said housing in a manner to permit limited linear movement thereof and engaging the teeth of the first, second and third gear sector members respectively to limit the pivoting thereof in either direction with the camming elements, each locking finger being spring biased in one direction or the other as long as the camming element associated therewith is not in the same angular position as the gear sector element associated therewith, first, second and third electrical switches mounted within said housing adjacent each of the locking fingers, each of said switches comprising a first and second fixed contact with a movable blade contact therebetween, each movable blade contact being engaged by the first, second and third locking fingers respectively so as to be positioned midway between the fixed contacts when the locking finger is not under a spring bias and to be in contact with either the first or second fixed contact when the locking finger is spring biased in either direction, said position device determining the movement of the horizontal, rear vertical and front vertical position of the seat mechanism controlled by the position of the first, second and third movable blade contacts respectively, said seat mechanism including first, second and third elements movable in response to the changing horizontal, rear vertical and front vertical position of the seat respectively, a reversible electric motor adapted to actuate said seat mechanism, a first, second and third solenoid means adapted to selectively control the horizontal, rear vertical and front vertical position of the seat respectively, an electrical circuit for energizing the motor including two directional relays for controlling the direction of rotation of the motor, a triple pole single throw switch having the first set of contacts thereof connected in series with said first solenoid means and the movable contact of said first electrical switch, the second set of contacts thereof connected in series with said second solenoid means and the movable blade contact of the second electrical switch and the third set of contacts connected in series with said third solenoid means and the movable blade contact of the third electrical switch, said first fixed contacts of each of the electrical switches being connected in series with one of the directional relays and the second fixed contacts of each of the electrical switches being connected in series with the other of the directional relays, one of said directional relays being a master relay to take preference in controlling the direction of rotation of the electric motor whereby when the contacts of the triple pole switch are closed the seat will move until it reaches a horizontal, rear vertical and front vertical position wherein the first, second and third camming elements respectively reach the same angular position as the locked gear sector members associated therewith, including fourth, fifth and sixth gear sector members pivotally mounted within the housing and spring connected to said first, second and third camming elements respectively, fourth, fifth and sixth locking fingers engaging the teeth of the fourth, fifth and sixth gear sector members respectively to limit the pivoting thereof, fourth, fifth and sixth electrical switches mounted within the housing with the movable blade contact of each being engaged for actuation by the fourth, fifth and sixth locking fingers respectively, and a second triple pole single throw switch, said second triple pole switch and the fourth, fifth and sixth electrical switches being connected in parallel with the first-mentioned triple pole switch and the first, second and third electrical switches whereby the seat can be automatically moved to either of two predetermined positions depending upon which of the triple pole switches is actuated.

References Cited in the file of this patent

UNITED STATES PATENTS

| | | |
|---|---|---|
| 1,814,826 | Carpenter | July 14, 1931 |
| 2,561,187 | Elliot | July 17, 1951 |
| 2,565,334 | Weingarden | Aug. 21, 1951 |
| 2,623,136 | Mekelburg | Dec. 23, 1952 |
| 2,701,330 | Schwarz et al. | Feb. 1, 1955 |
| 2,827,105 | Brundage | Mar. 18, 1958 |
| 2,858,715 | Kearney et al. | Nov. 4, 1958 |
| 3,044,829 | Dolgorukov | July 17, 1962 |